United States Patent
Tong et al.

(10) Patent No.: US 7,400,801 B1
(45) Date of Patent: Jul. 15, 2008

(54) BIDIRECTIONAL HDCP MODULE USING SINGLE OPTICAL FIBER AND WAVEGUIDE COMBINER/SPLITTER

(75) Inventors: Xiaolin Tong, Irvine, CA (US); Shing-Wu P. Tzeng, Fountain Valley, CA (US); Randall Blair, Oceanside, CA (US); Todd Hu, Irvine, CA (US)

(73) Assignee: Owlink Technology, Inc., Irvine, CA (US)

( * ) Notice: Subject to any disclaimer, the term of this patent is extended or adjusted under 35 U.S.C. 154(b) by 0 days.

(21) Appl. No.: 11/765,329

(22) Filed: Jun. 19, 2007

(51) Int. Cl.
*G02B 6/26* (2006.01)
*H04B 10/00* (2006.01)

(52) U.S. Cl. .............................. 385/43; 385/14; 385/31; 385/33; 385/45; 385/49; 385/88; 385/89; 385/92; 385/93; 398/135; 398/138; 398/139

(58) Field of Classification Search .................. 385/31, 385/30, 28, 27, 33, 34, 39, 43, 44, 45, 49, 385/50, 88, 89, 92, 93, 94; 398/135, 137, 398/138, 139
See application file for complete search history.

(56) References Cited

U.S. PATENT DOCUMENTS

| | | | |
|---|---|---|---|
| 4,704,741 A * | 11/1987 | Shikada | ...................... 398/204 |
| 5,325,423 A | 6/1994 | Lewis | |
| 5,390,269 A | 2/1995 | Palecek et al. | |
| 5,481,634 A | 1/1996 | Anderson et al. | |
| 5,546,487 A * | 8/1996 | Fantone | ....................... 385/33 |
| 5,621,715 A | 4/1997 | Ohyama | |
| 5,887,097 A * | 3/1999 | Henry et al. | .................. 385/39 |
| 6,019,520 A | 2/2000 | Lin et al. | |

(Continued)

FOREIGN PATENT DOCUMENTS

GB 2288907 A 1/1995

(Continued)

OTHER PUBLICATIONS

Bell, Ian; NEC Develops Wireless HDTV Tranceiver, Designtechnica News, Apr. 6, 2005, [online], [retrieved on Sep. 20, 2005]. Retrieved from the Internet <URL: http: http://news.designtechnica.com/article7034.html>, pp. 1-5.

(Continued)

*Primary Examiner*—Brian M Healy
(74) *Attorney, Agent, or Firm*—Fenwick & West LLP

(57) ABSTRACT

Embodiments provide single fiber bidirectional HDCP modules. A signal fiber module includes at least one laser and at least one detector and a waveguide combiner/splitter. An optical fiber is used as a cylindrical lens in order to partially collimate in the vertical axis the optical signals entering and leaving branches of a waveguide. The branches of the waveguide have lens-shape interfaces in order to at least partially collimate in the horizontal axis the beams entering and leaving the waveguide. Each branch of the waveguide tapers toward a join-section of the waveguide. At the join section, the cross-section of a laser branch is smaller than the cross-section of a detector branch. If more than one detector is present in a module, the cross-sections of the detector branches differ from each other. If more than one laser is present in a module, the cross-sections of the laser branches differ from each other.

27 Claims, 8 Drawing Sheets

U.S. PATENT DOCUMENTS

| | | | |
|---|---|---|---|
| 6,111,677 | A | 8/2000 | Shintani et al. |
| 6,151,432 | A | 11/2000 | Nakajima et al. |
| 6,347,889 | B1 | 2/2002 | Cheng |
| 6,353,169 | B1 | 3/2002 | Juszkiewicz et al. |
| 6,381,045 | B1 * | 4/2002 | DiGiovanni et al. .......... 398/42 |
| 6,496,636 | B1 * | 12/2002 | Braiman et al. ............. 385/129 |
| 6,524,015 | B1 | 2/2003 | Cheng |
| 6,637,948 | B2 | 10/2003 | Shirai et al. |
| 6,686,530 | B2 | 2/2004 | Juszkiewicz et al. |
| 6,748,144 | B2 | 6/2004 | Lindsey |
| 6,766,078 | B1 | 7/2004 | Canning |
| 6,915,080 | B2 | 7/2005 | Heminger et al. |
| 7,034,891 | B2 | 4/2006 | Joung et al. |
| 7,146,105 | B1 * | 12/2006 | Tzeng et al. ................ 398/128 |
| 2001/0012428 | A1 | 8/2001 | Nakajima et al. |
| 2002/0095618 | A1 | 7/2002 | Orcutt et al. |
| 2002/0126340 | A1 | 9/2002 | Nikiforov et al. |
| 2003/0039002 | A1 | 2/2003 | Toriumi et al. |
| 2003/0043435 | A1 | 3/2003 | Oettinger et al. |
| 2003/0133674 | A1 | 7/2003 | Fujita et al. |
| 2003/0147010 | A1 | 8/2003 | Joung et al. |
| 2003/0147650 | A1 | 8/2003 | Hwang et al. |
| 2003/0208779 | A1 | 11/2003 | Green et al. |
| 2004/0156590 | A1 | 8/2004 | Gunn et al. |
| 2004/0218870 | A1 | 11/2004 | Blauvelt et al. |
| 2005/0053379 | A1 | 3/2005 | Jockerst et al. |
| 2005/0069130 | A1 | 3/2005 | Kobayashi |
| 2005/0078913 | A1 | 4/2005 | Blauvelt et al. |
| 2005/0111309 | A1 | 5/2005 | Peng |
| 2006/0153503 | A1 | 7/2006 | Suzuki et al. |
| 2006/0153504 | A1 | 7/2006 | Suzuki et al. |

FOREIGN PATENT DOCUMENTS

| | | |
|---|---|---|
| GB | 2288138 A | 8/1995 |
| JP | 2003-029096 A | 1/2003 |
| JP | 2003-167166 A | 6/2003 |
| JP | 2003-264513 A | 9/2003 |
| KR | 1020040007858 A | 1/2004 |

OTHER PUBLICATIONS

Case, Loyd, ViXS Enables Wireless HDTV, Jan. 9, 2004, PCMagazine [online], [retrieved on Sep. 20, 2005]. Retrieved from the Internet <URL: http: http://www.pcmag.com/article2/0,4149,1429995,00.asp>, pp. 1-7.

Chen, Ray, et al.; Fully Embedded Board-Level Guided-Wave Optoelectronic Interconnects, Proceedings of the IEEE, vol. 88, No. 6, Jun. 2000 [online], [retrieved on Sep. 20, 2005]. Retrieved from the Internet <URL: http://129.116.90.208/GroupPapers/2.pdf>, pp. 780-793.

Chen, Ray, et al.; Si CMOS process-compatible guided-wave optical interconnects; Proc. SPIE vol. 3632, Optoelectronic Interconnects VI, Julian P. Bristow; Suning Tang; Eds, Apr. 1999, pp. 22-27.

Converters Overview, AJA Video Systems, [online], [retrieved on Oct. 3, 2006]. Retrieved from the Internet<URL:http://www.aja.com/html/products_converters_HDP.html>.

Cronin, N.J., "Microwave and Optical Waveguides," 1995, pp. 53 and 61-63.

Frequently Asked Questions, Gateway Corporation, [online], [retrieved on Sep. 28, 2005]. Retrieved from the Internet <URL: http://support.gateway.com/s/CsmrEltrcs/Shared/2517984faq67.shtml>, pp. 1-2.

HDMI Switch targets dual display theater systems, Thomas Net, [online], [retrieved on Oct. 3, 2006]. Retrieved from the Internet<URL:http://news.thomasnet.com/fullstory/491909/148>.

HDV15 Features and Specifications, Zektor Hometheater Switches, [online], [retrieved on Oct. 3, 2006]. Retrieved from the Internet<URL:http://www.zektor.com/hdvi5/specs.htm>.

International Search Report and Written Opinion, PCT/US06/25832, Aug. 30, 2007, 9 pages.

Somers, Steve, DVI and HDMI: The Short and Long of It, Extron Electronics, [retrieved on Oct. 3, 2006]. Retrieved from the Internet<URL:http://www.extron.com/company/article.aspx?id=dvihdmi_ts>.

* cited by examiner d23 < d21 < d22

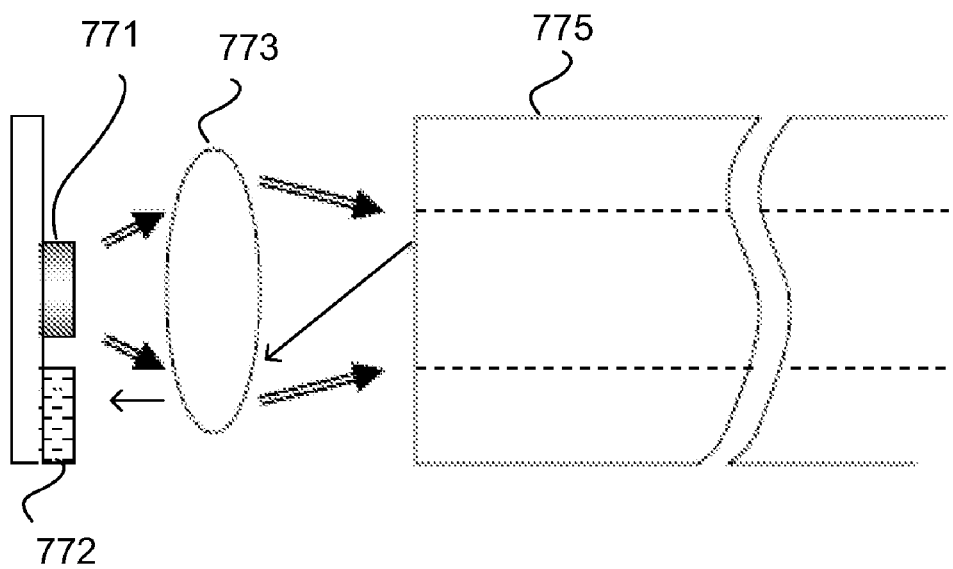
FIGURE 7A – PRIOR ART
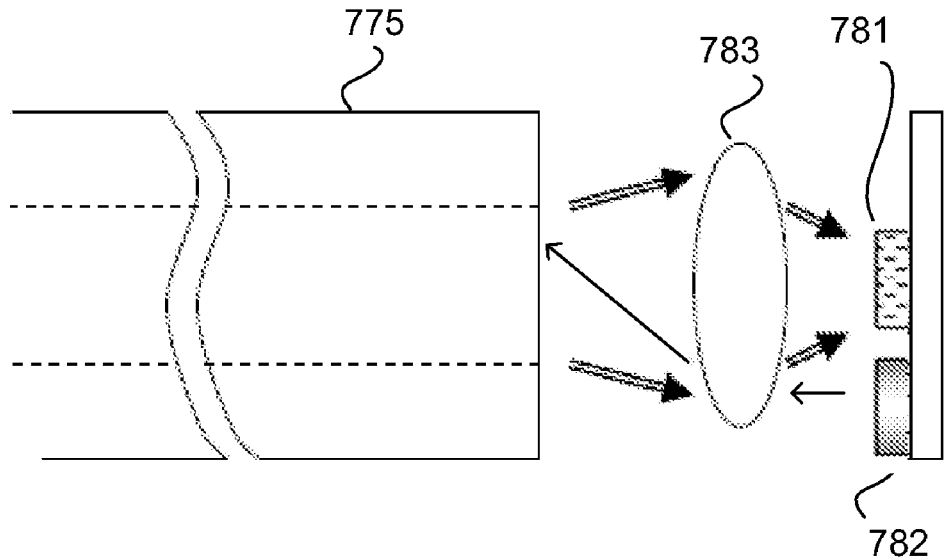
FIGURE 7B – PRIOR ART

BIDIRECTIONAL HDCP MODULE USING SINGLE OPTICAL FIBER AND WAVEGUIDE COMBINER/SPLITTER

CROSS-REFERENCE TO RELATED APPLICATION(S)

This application is related to U.S. patent application Ser. No. 11/173,409, titled "Bidirectional HDCP Transmission Module Using Single Optical Fiber," filed Jun. 30, 2005, and U.S. patent application Ser. No. 10/411,559, titled "Mems-Based Optical Wireless Communication System", filed Apr. 10, 2003, now U.S. Pat. No. 7,146,105. All of the foregoing are hereby incorporated by reference in their entirety.

BACKGROUND OF THE INVENTION

1. Field of the Invention

This invention relates generally to high-bandwidth digital content protection (HDCP) transmission systems and relates more particularly to optical fiber links with waveguide combiners or splitters.

2. Description of the Related Art

High-bandwidth digital content protection (HDCP) is a specification developed by Intel Corporation to protect digital entertainment content across the DVI/HDMI interface. The HDCP specification provides a robust method for transmitting and receiving digital entertainment content to DVI/HDMI-compliant digital displays. High-bandwidth is usually achieved by one of two means: shielded copper wires or an optical fiber link. The first generation of HDCP transmission systems were realized by parallel shielded copper wire cables. Due to bandwidth limits on optical fiber links, multiple parallel optical fibers have been traditionally used for HDCP applications. A four-fiber module has three forward channels and one backward channel. It requires four light sources, four fiber links, and four receivers. A two-fiber module has one forward channel and one backward channel. It requires two light sources, two fiber links, and two receivers. For longer distance applications, such as 100 to 1000 meters, the cost of buying and maintaining multiple fibers is considered expensive.

If a single fiber bidirectional optical transmission system is used, waveguide combiners and splitters require a high precision assembly in the range of ±5 um for multimode application using conventional waveguide layouts. The need for high precision in manufacture increases production costs and lowers productivity.

SUMMARY

Embodiments of the invention provide systems and methods for single fiber bidirectional HDCP transmission scheme. A single fiber design has an advantage in cost and simplicity, particularly for relatively long transmission distances, such as for use around a conference center or sports arena.

In one embodiment, a single fiber transmission module includes at least one laser and at least one detector. An optical fiber is used as a cylindrical lens in order to partially collimate in the vertical axis the optical signals entering and leaving a waveguide. The branches of the waveguide have lens-shape interfaces in order to at least partially collimate in the horizontal axis the beams entering the waveguide from the laser and leaving the waveguide toward the fiber tip on one end or the detector on other end. Thus, the transmission module has an improved tolerance for placement shift of the laser and the fiber tip on one end or detector components on the other end with respect to the waveguide. Each branch of the waveguide tapers toward a join-section where the branches merge. An asymmetrical layout of the join-section increases the power coupling in preferred channel and decreases the power coupling in non-preferred channels. In one embodiment, two laser branches of the waveguide are tapered down to smaller cross-sections compared to the cross-section of the branch of the waveguide leading to the detector. In one embodiment, the two laser branches are also different in size from each other.

In another embodiment, a single fiber receiver module includes at least one detector and at least one laser. An optical fiber is used as a cylindrical lens in order to partially collimate in the vertical axis the optical signals entering and leaving a waveguide. The branches of the waveguide have lens-shape interfaces in order to at least partially collimate in the horizontal axis the beams entering the waveguide from the laser and leaving the waveguide toward the detector on one end or the fiber tip on the other end. Thus, the receiver module has an improved tolerance for placement shift of the laser and detector components with respect to the waveguide. Each branch of the waveguide tapers toward a join-section where the branches merge. An asymmetrical layout of the join-section increases the power coupling for preferred channels and decreases the power coupling for non-preferred channel. In one embodiment, a laser branch is tapered down to a smaller cross section compared to the cross sections of the branches of the waveguide leading to two detectors. In one embodiment, the two detector branches are also different in size from each other.

In one application, the present invention is applied in an optical I$^2$C bus. In this dual wire bus for bidirectional inter-IC communications, one wire transmits a clock signal from master to slave, and the other wire writes a data packet signal to the slave or reads a data packet signal back from the slave.

The features and advantages described in this summary and the following detailed description are not all-inclusive. Many additional features and advantages will be apparent to one of ordinary skill in the art in view of the drawings, detailed description, and claims.

BRIEF DESCRIPTION OF THE DRAWINGS

FIG. 7A is a transmission end diagram showing a conventional arrangement of a light source, detector lens, and fiber cross section.

FIG. 7B is a receiving end diagram showing a conventional arrangement of a light source, detector lens, and a fiber cross section.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE EMBODIMENTS

Figure 1A:
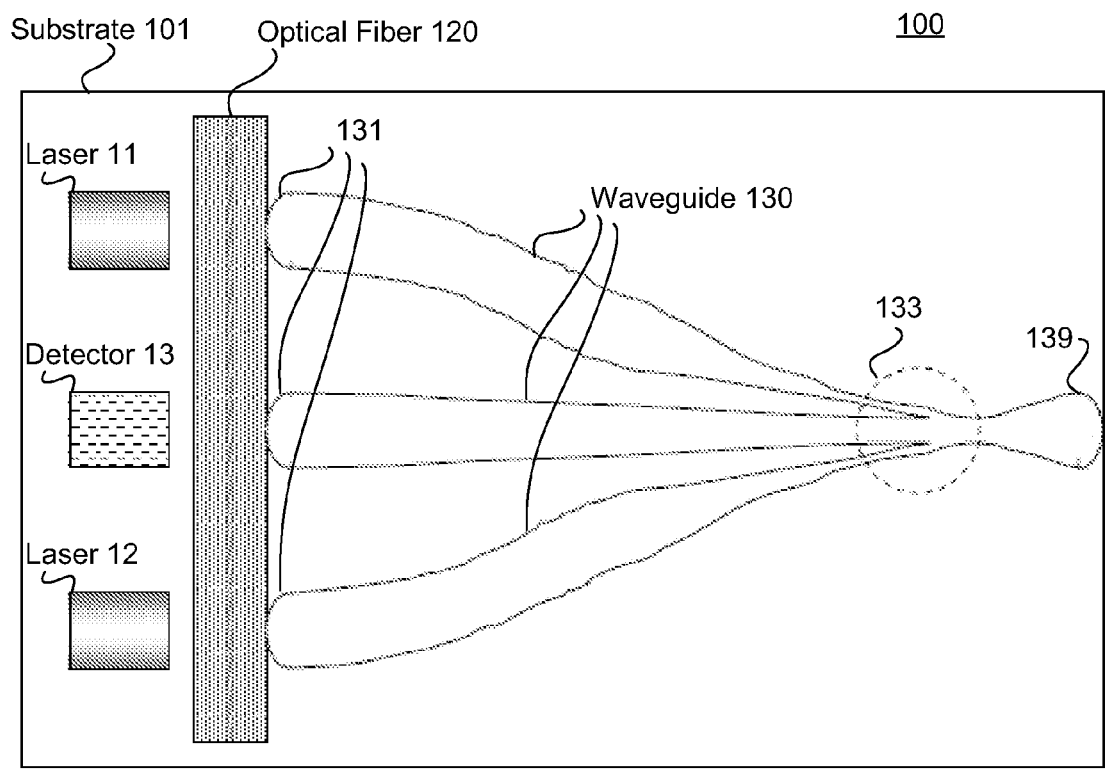
FIG. 1A illustrates a top view of a transmission module with a waveguide combiner/splitter having two forward channels and one backward channel, in accordance with one embodiment.

FIG. 1A illustrates a top view of a transmission module 100 with a waveguide combiner/splitter having two forward channels and one backward channel, in accordance with one embodiment of the invention. The transmission module 100 includes two lasers 11, 12, and a detector 13 on a substrate 101. Substrate 101 can be, for example, a silicon substrate wafer, or other material such as a glass, polymer or a plastic. In one embodiment, the detector 13 is a PIN detector (a photodiode made from "P" and "N" semiconductor layers with a middle insulator layer), but use of other detectors known to those of skill in the art are also possible. To successfully deploy a single fiber in bidirectional communication, the signal cross talk must be reduced. In one embodiment, the forward channels use a pair of near infrared light sources, lasers 11, 12, such as 1310 nm and 1550 nm in GHz modulation level. The backward channel has another light source, laser 33 in FIG. 3A, for example near 1490 nm in GHz modulation level. In one embodiment, lasers 11, 12 are low cost, small lasers having an output angle of ±25 degrees, such that the optical power tends to disperse in the vertical and horizontal axes. In one embodiment, a Fabry-Perot laser diode chip having an output angle of approximately ±20 degrees vertical and ±15 degrees horizontal is used.

As shown in FIG. 1A, an optical fiber 120 is included lengthwise in front of the lasers 11, 12 and the detector 13 to at least partially collimate in the vertical axis the optical beams entering and leaving the waveguide 130. In this transverse orientation, the optical fiber 120 acts as a cylindrical lens and increases coupling efficiency with the waveguide 130. In one embodiment, the optical fiber 120 is an industry standard in diameter, such as 125 um. A set of lens-shape interfaces 131 are provided on each branch of the waveguide 130 in order to at least partially collimate the beams entering and leaving the waveguide 130 in the horizontal axis. In one embodiment, the lens-shape interfaces 130 have a diameter of approximately 150 um, and are oriented so that a convex surface of the lens is next to optical fiber 120. In addition to increasing the position tolerance, another advantage of the use of the optical fiber 120 as a cylindrical lens is that it allows the lasers 11, 12 and detector 13 to be moved away from the waveguide 130, which provides room to access the lasers 11, 12 and detector 13 for assembly. The ease of access and high tolerance for position errors increases manufacturing productivity and reduces costs. Traditionally, a silicon multimode waveguide 130 has allowed a vast amount of modes to propagate, but when coupling with multimode optical fiber, only a small portion of lower modes are useful because higher modes are usually lost at the interface. Another advantage of the present invention is that the total mode distribution in the waveguide 130 is reduced by collimating the beam at the interface so that more optical power can be coupled through lens-shape waveguide tip 139 into the optical fiber downstream, not shown, at the output end.

Figure 1B:
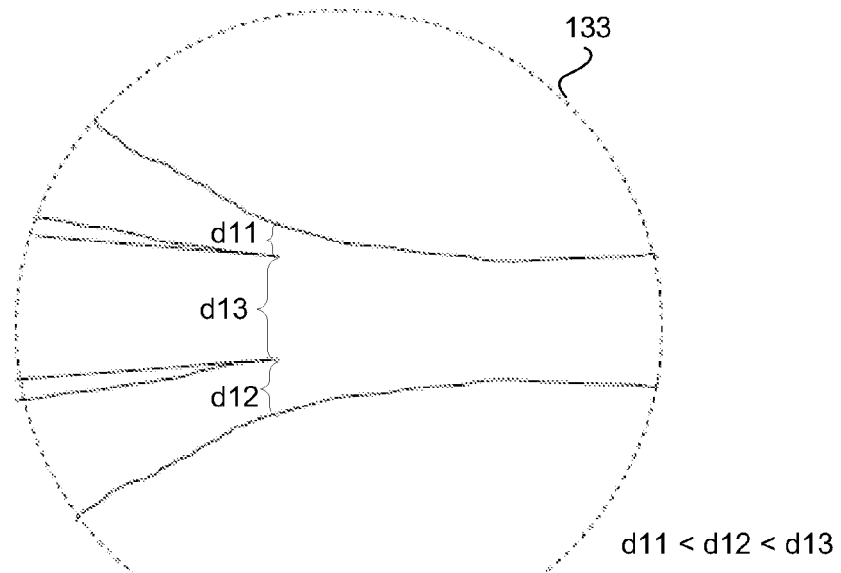
FIG. 1B illustrates a top detail view of the inset portion of FIG. 1A.

In FIG. 1A, the light from lasers 11, 12 that enter the lens shape interfaces 131 of the branches of the waveguide 130 propagates along the forward channels through the waveguide 130 toward the lens-shape waveguide tip 139. Conversely, light that enters a lens-shape waveguide tip 139 from the multimode optical fiber propagates along the backward channel through the waveguide 130 towards the detector 13. Each branch of waveguide 130 tapers toward and may curve toward the join-section 133 without losing optical power. Thus, even as the waveguide branches narrow, the amount of optical power flowing through the waveguide remains the same. In one embodiment, the backward channel branch also tapers toward the join-section 133, but in other embodiments it does not. FIG. 1B illustrates a top detail view of the join-section 133 of FIG. 1A. In the join-section 133, an asymmetrical layout increases the power coupling. The two laser branches of waveguide 130 are tapered down to smaller sizes d11, and d12 compared to the size of the detector 13 branch d13 of waveguide 130. In one embodiment, the detector 13 branch of the waveguide 130 comprises 70 to 80% of the cross section of the juncture between the three branches. Thus, the majority of the optical power propagating via the backward channel will reach the detector 13 rather than the lasers 11, 12. In one embodiment, the two laser branches are slightly different in size, for example by 10%. Two identical laser branches would have an interference effect at an easily noticeable level at different wavelengths. By shifting the propagation constant between the two laser branches, the interference effect can be reduced. In one embodiment, d11 is smaller than d12 which is smaller than d13, as shown in FIG. 1B. In another embodiment, d12 is smaller than d11, for example by 10%. As the laser 11, 12 branches are tapered down, the modes of the light within the waveguide 130 branches may shift higher. At the junction area 133 where the cross-section jumps wider, the modes may shift back down. Optical power loss at the join-section 133 is negligible.

Figure 2:
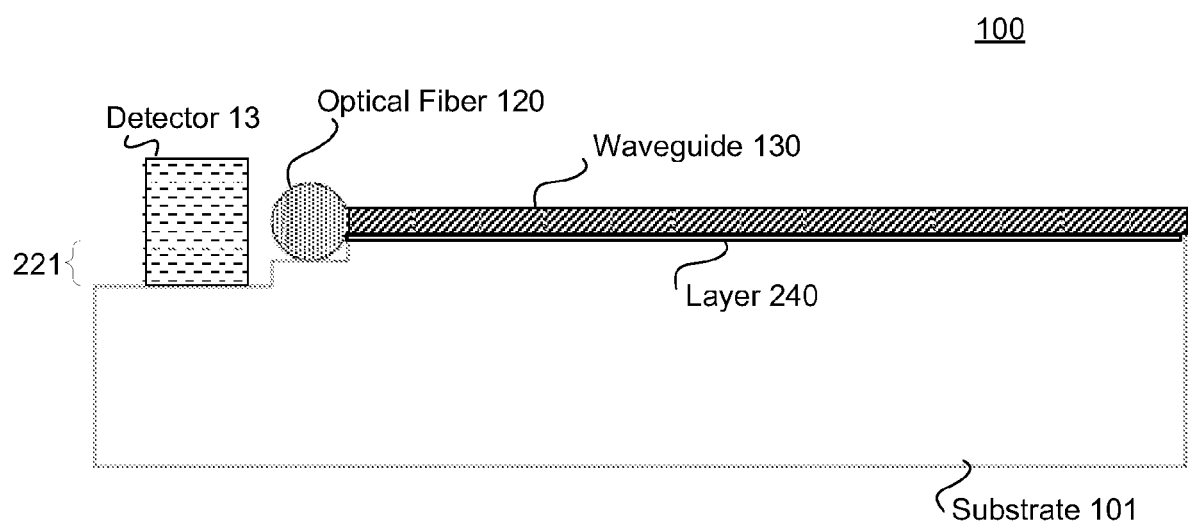
FIG. 2 illustrates a side view of a transmission module, in accordance with one embodiment.

FIG. 2 illustrates a side view of a transmission module 100, in accordance with one embodiment of the invention. FIG. 2 shows a side view along the center line of FIG. 1A. As shown in FIG. 2, a deep trench 221 in the left side of substrate 101 is used to align the detector 13 and lasers 11, 12 through the optical fiber 120 into the waveguide 130. In some embodiments, such as those employing flip chip lasers, there is no need for a deep trench. Detector 13 and lasers 11, 12, can be attached to substrate 101 using an epoxy, soldering, or any other bonding method known to those of skill in the art. In one embodiment, waveguide 130 is approximately 50 um by 50 um in cross section, and waveguide 130 is isolated from substrate 101 by a thin layer of lower index material 240, for example 1 um thick. In one embodiment, layer 240 is composed of silicon oxide, or another material that is easy to produce on top of the substrate 101.

Figure 3A:
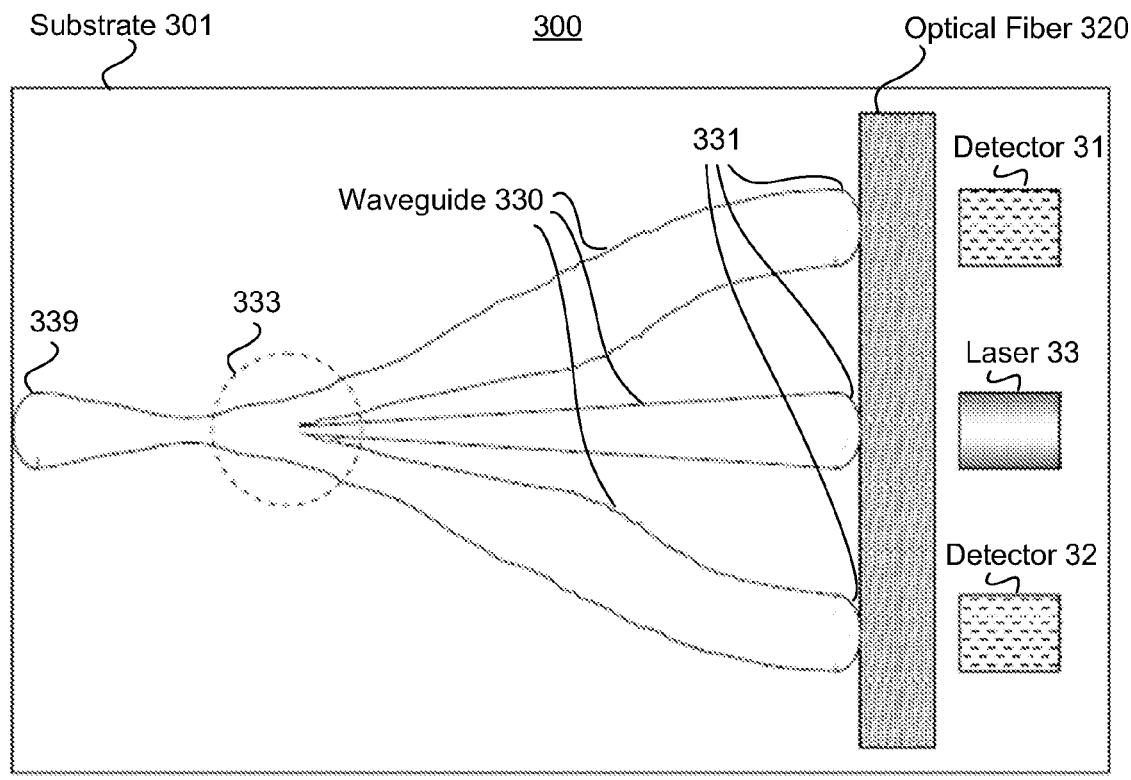
FIG. 3A illustrates a top view of a receiver module with a waveguide combiner/splitter having two forward channels and one backward channel, in accordance with one embodiment.

FIG. 3A illustrates a top view of a receiver module 300 with a waveguide combiner/splitter having two forward channels and one backward channel, in accordance with one embodiment. The receiver module 300 includes one laser 33, and two detectors 31, 32 on a substrate 301. Substrate 301 can be, for example, a silicon substrate wafer, or other material such as a glass, a polymer or a plastic. In one embodiment, the detectors 31, 32 are PIN detectors, but use of other detectors known to those of skill in the art is also possible. As discussed above with reference to FIG. 1A, in one embodiment, laser 33 operates near 1490 nm in GHz modulation level. In one embodiment, laser 33 is a low cost, small laser having an output angle of ±25 degrees, such that the optical power tends to disperse in the vertical and horizontal axes. In one embodiment, a Fabry-Perot laser diode chip having an output angle of approximately ±20 degrees vertical and ±15 degrees horizontal is used.

As shown in FIG. 3A, an optical fiber 320 is included lengthwise in front of the laser 33 and detectors 31, 32 to at least partially collimate in the vertical axis the optical beams entering and leaving the waveguide 330. In this transverse orientation, the optical fiber 320 acts as a cylindrical lens and increases coupling efficiency with the waveguide 330. In one embodiment, the optical fiber 320 is an industry standard in diameter, such as 125 um. A set of lens-shape interfaces 331 are provided on each branch of the waveguide 330 in order to at least partially collimate the beams entering and leaving the waveguide 330 in the horizontal axis. In one embodiment, the lens-shape interfaces 330 have a diameter of approximately 150 um, and are oriented so that a convex surface of the lens is next to optical fiber 320. Similar advantages of the use of optical fiber 320 in the receiver module 330 are present as the advantages discussed with respect to the use of optical fiber 120 in the transmission module 100 discussed above with reference to FIG. 1A.

Figure 3B:
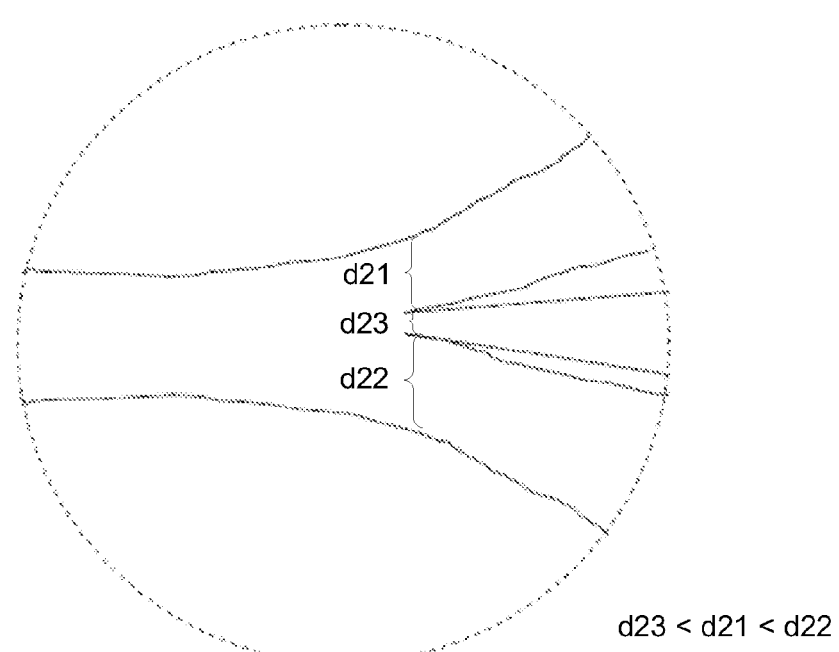
FIG. 3B illustrates a top detail view of the inset portion of FIG. 3A.

In FIG. 3A, the light from laser 33 that enters the lens-shape interface 331 of the waveguide 330 propagates along the backward channel through the waveguide 330 toward the lens-shape waveguide tip 339. Conversely, light that enters the lens-shape waveguide tip 339 from the multimode optical fiber, not shown, propagates along the forward channels through the waveguide 330 towards the detectors 31, 32. Optionally an optical filter, not shown, can be put in front of one or both of the detectors 31, 32 to select a particular signal. Alternatively, a filter-like coating can be applied to the surface of one or both of the detectors 31, 32. Each branch of the waveguide 330 tapers toward and may curve toward the join-section 333 without losing optical power. Thus, even as the waveguide branches narrow, the amount of optical power flowing through the waveguide remains the same. In one embodiment, the forward channel branch also tapers toward the join-section 333, but in other embodiments it does not. FIG. 3B illustrates a top detail view of the join-section 333 of FIG. 3A. In the join-section 333, an asymmetrical layout increases the power coupling. The laser branch of waveguide 330 is tapered down to a smaller size compared to the size of the detector 31, 32 branches d21, d22 of waveguide 330. In one embodiment, the two detector branches of the waveguide 330 comprise 70 to 80% of the cross section of the juncture between the three branches. Thus, the majority of the optical power propagating via the backward channel will reach the detectors 31, 32 rather than laser 33. In one embodiment, the two detector 31, 32 branches are slightly different in size, for example by 10%. Two identical detector branches would have an interference effect at an easily noticeable level at different wavelengths. By shifting the propagation constant between the two detector branches, the interference effect can be reduced. In one embodiment, d23 is smaller than d21 which is smaller than d22, as shown in FIG. 3B. In another embodiment, d22 is smaller than d21, for example by 10%. As the laser 33 branch is tapered down, the modes of the light within the waveguide 330 branch may shift higher. At the junction area 333 where the cross-section jumps wider, the modes may shift back down. Optical power loss at the join-section 333 is negligible.

Figure 4:
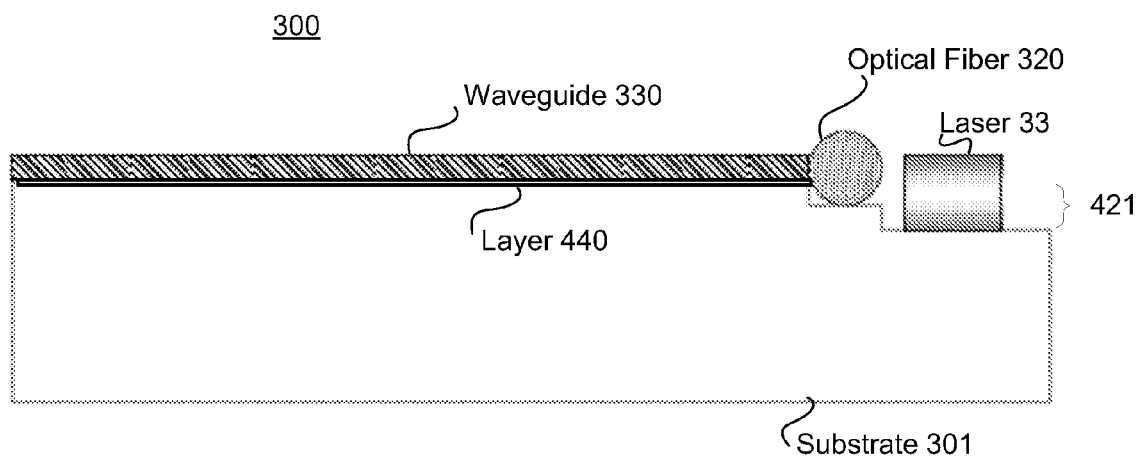
FIG. 4 illustrates a side view of a receiver module, in accordance with one embodiment.

FIG. 4 illustrates a side view of a receiver module 300, in accordance with one embodiment. FIG. 4 shows a side view along the center line of FIG. 3A. As shown in FIG. 4, a deep trench 421 in the right-hand side of substrate 301 is used to align the laser 33 and detectors 31, 32 through the optical fiber 320 into the waveguide 330. Detectors 31, 32 and laser 33 can be attached to substrate 301 using an epoxy, soldering, or any other bonding method known to those of skill in the art. In one embodiment, waveguide 330 is approximately 50 um by 50 um in cross section, and waveguide 330 is isolated from substrate 301 by a thin layer 440, for example 1 um thick. In one embodiment, layer 440 is composed of silicon oxide.

Figure 5A:
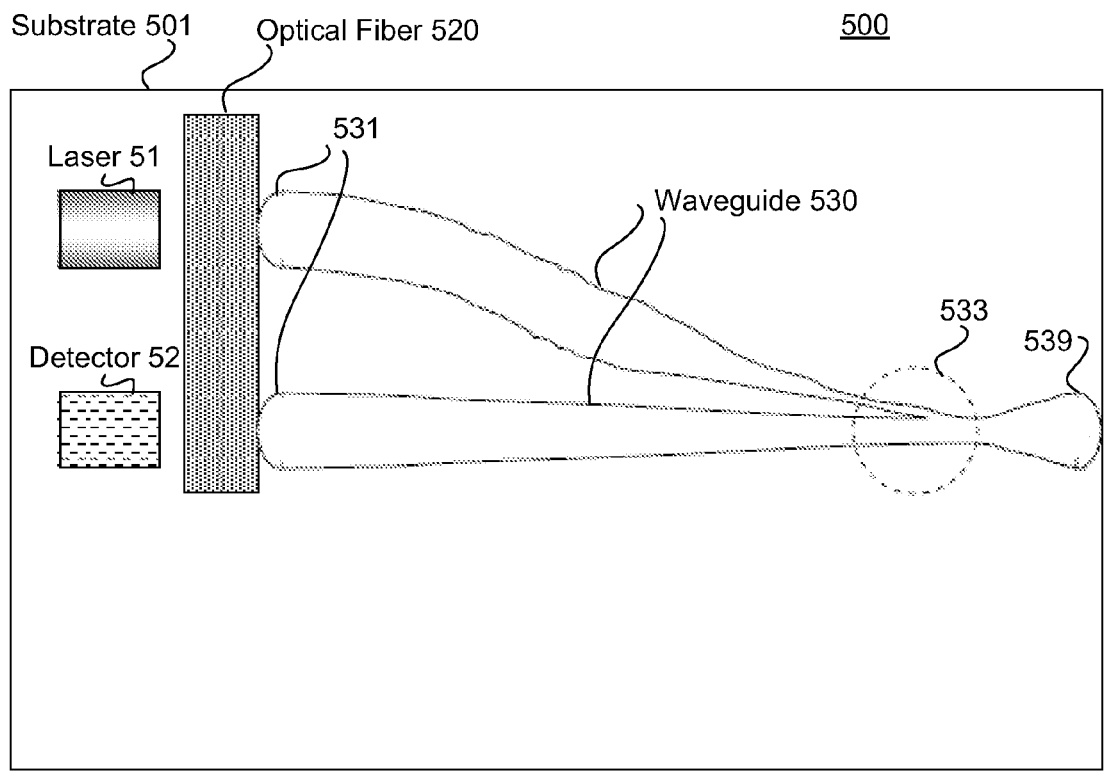
FIG. 5A illustrates a top view of a transmission module with a waveguide combiner/splitter having one forward channel and one backward channel.
Figure 5B:
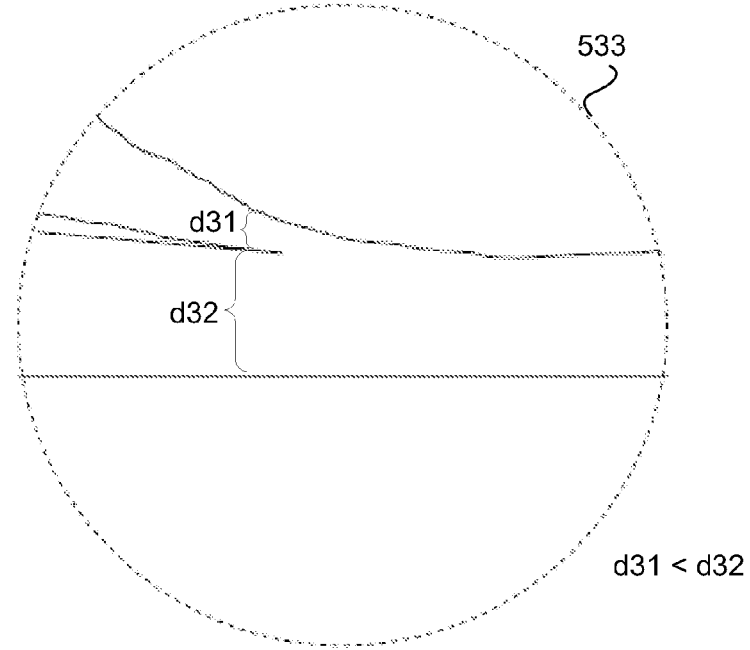
FIG. 5B illustrates a top detail view of the inset portion of FIG. 5A.

In the embodiments described above with reference to FIGS. 1A-4, the modules have had two forward channels and one backward channel. More or fewer forward channels can also be used, with modification to the layout. Thus, for example, systems with 5 forward channels, 4 forward channels, 3 forward channels, 2 forward channels, or 1 forward channels are also possible. As an example, FIG. 5A illustrates a top view of a transmission module 500 with a waveguide combiner/splitter having one forward channel and one backward channel. The transmission module 500 includes one laser 51 and one detector 52 on substrate 501. An optical fiber 520 is included lengthwise in front of the laser 51 and detector 52 and lens-shape interfaces 531 are provided on each branch of the waveguide 530 in order to partially collimate the optical beams entering and leaving the waveguide 530, as described above with reference to FIG. 1A. Light from laser 51 that enters the waveguide 530 propagates through the waveguide 530 toward the lens-shape waveguide tip 539. Conversely, light that enters the lens-shape waveguide tip 539 from the multimode optical fiber propagates through the waveguide 530 towards the detector 52. Each branch of the waveguide 530 tapers toward and may curve toward the join-section 533 without losing optical power. In one embodiment, the backward channel branch also tapers toward the join-section 533, but in other embodiments it does not. FIG. 5B illustrates a top detail view of the join-section 533 of FIG. 5A. In the join section 533, an asymmetrical layout increases the power coupling. The laser 51 branch tapers down to a smaller size d31 compared to the size of the detector 52 branch d32 of the waveguide 530. In one embodiment, the laser 51 branch is approximately 10% of the cross section whereas the detector 52 branch is approximately 90% of the cross section at the juncture. As the laser 51 branch is tapered down, the modes of the light within the waveguide 530 branch may shift higher. At the junction area 533 where the cross-section jumps wider, the modes may shift back down. Optical power loss at the join-section 533 is negligible.

Figure 6A:
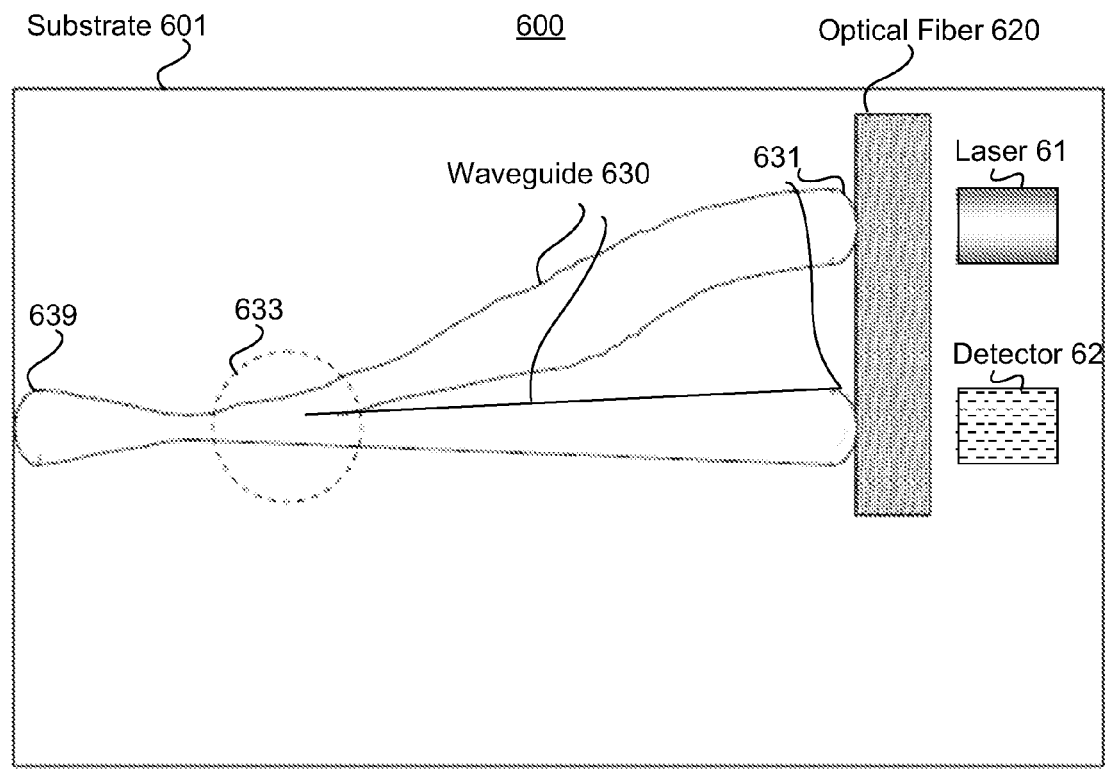
FIG. 6A illustrates a top view of a receiver module with a waveguide combiner/splitter having one forward channel and one backward channel.
Figure 6B:
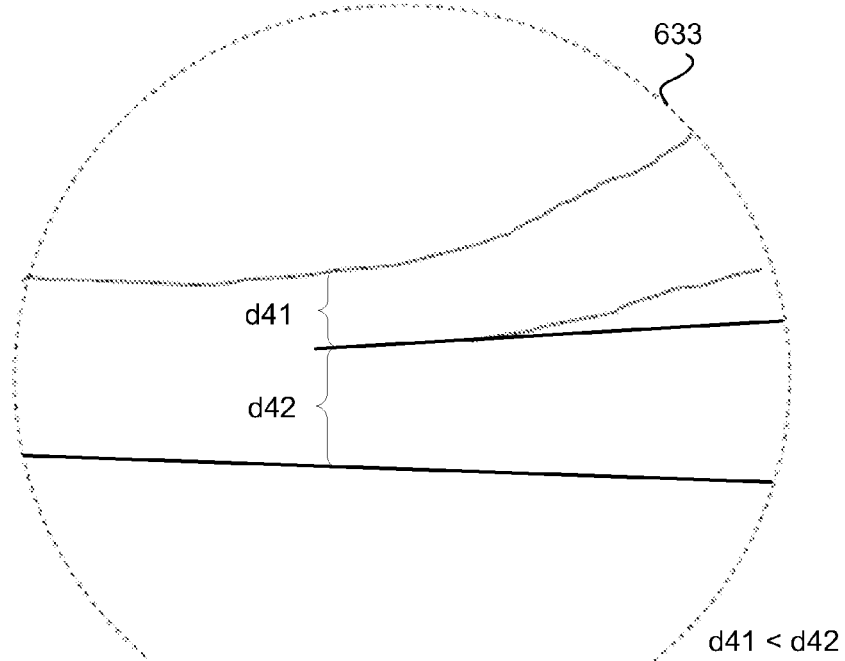
FIG. 6B illustrates a top detail view of the inset portion of FIG. 6B.

FIG. 6A illustrates a top view of a receiver module 600 with a waveguide combiner/splitter having one forward channel and one backward channel. The receiver module 600 includes one laser 61 and one detector 62 on a substrate 601. An optical fiber 620 is included lengthwise in front of the laser 61 and detector 62 and lens-shape interfaces 631 are provided on each branch of the waveguide 630 in order to partially collimate the optical beams entering and leaving the waveguide 630, as described above with reference to FIG. 3A. Light from laser 61 that enters the waveguide 630 propagates through the waveguide 630 toward the lens-shape waveguide tip 639. Conversely, light that enters the lens-shape waveguide tip 639 from the multimode optical fiber propagates through the waveguide 630 towards the detector 62. Each branch of the waveguide 630 tapers toward and may curve toward the join-section 633 without losing optical power. In one embodiment, the forward channel branch also tapers toward the join-section 633, but in other embodiments it does not. FIG. 6B illustrates a top detail view of the join-section 633 of FIG. 6B. In the join section 633, an asymmetrical layout increases the power coupling. The laser branch 61 tapers down to a smaller size d41 compared to the size of the detector branch d42 of the waveguide 530. In one embodiment, the laser 62 branch is approximately 10% of the cross section whereas the detector 62 branch is approximately 90% of the cross section at the juncture. As the laser 61 branch is tapered down, the modes of the light within the waveguide 630 branch may shift higher. At the junction area 633 where the cross-section jumps wider, the modes may shift back down. Optical power loss at the join-section is negligible.

For comparison, FIG. 7A is a transmission end diagram showing a previously disclosed arrangement of a light source 771, detector 772, lens 773, and fiber cross section 775. FIG. 7B is a receiving end diagram showing a previously disclosed arrangement of a light source 782, detector 781, lens 783, and a fiber cross section 785. As shown, the light source 771 of the forward channel and the detector 772 of the backward channel are located at one end of the fiber 775. The detector 781 of the forward channel and the light source 782 of the backward channel are located at the other end of the optical fiber 775. Light from the light source 771 is focused by lens 773 into fiber 775, and light from fiber 775 is focused by lens 773 onto detector 772. Likewise, light from the light source 782 is focused by lens 783 into fiber 775, and light from fiber 775 is focused by lens 783 onto detector 781. On each end of the fiber 775, the lenses 773, 783 must be aligned precisely with the light sources 771, 782, detectors 772, 781 and fiber 775 in order to enable adequate optical power coupling.

During operation, an electronic circuit transforms parallel digital A/V signals into serial digital signals and modulates the forward channel light source 771 based on the serial signals. The output optical power is then coupled into the optical fiber 775, which may be either multimode or single mode fiber. At the receiving end, the detector 781 picks up an optical power intensity pattern. An electronic circuit then recovers the serial data back to parallel digital A/V signals for HD display. The light source 782 at the receiving end will send encoded signals to the transmission end through the same optical fiber 775. The detector 772 at the transmitter end decodes the backward channel signal and gives permission to transmit an A/V signal if the decoded signal is in agreement with the transmitter.

Figure 8A:
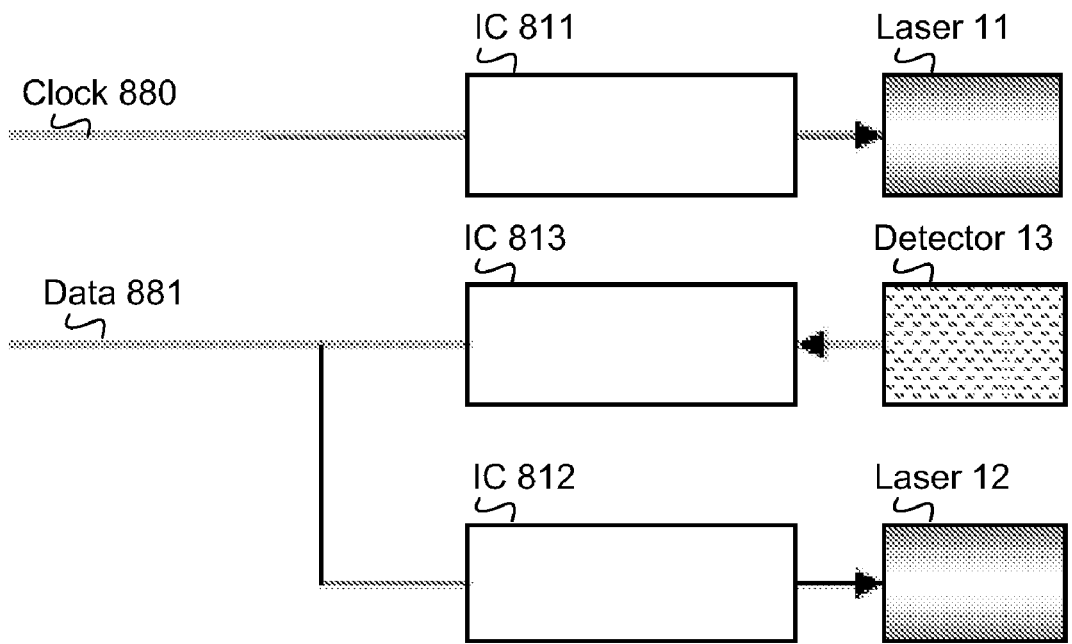
FIG. 8A illustrates an optical $I^2C$ bus configuration on the master side.
Figure 8B:
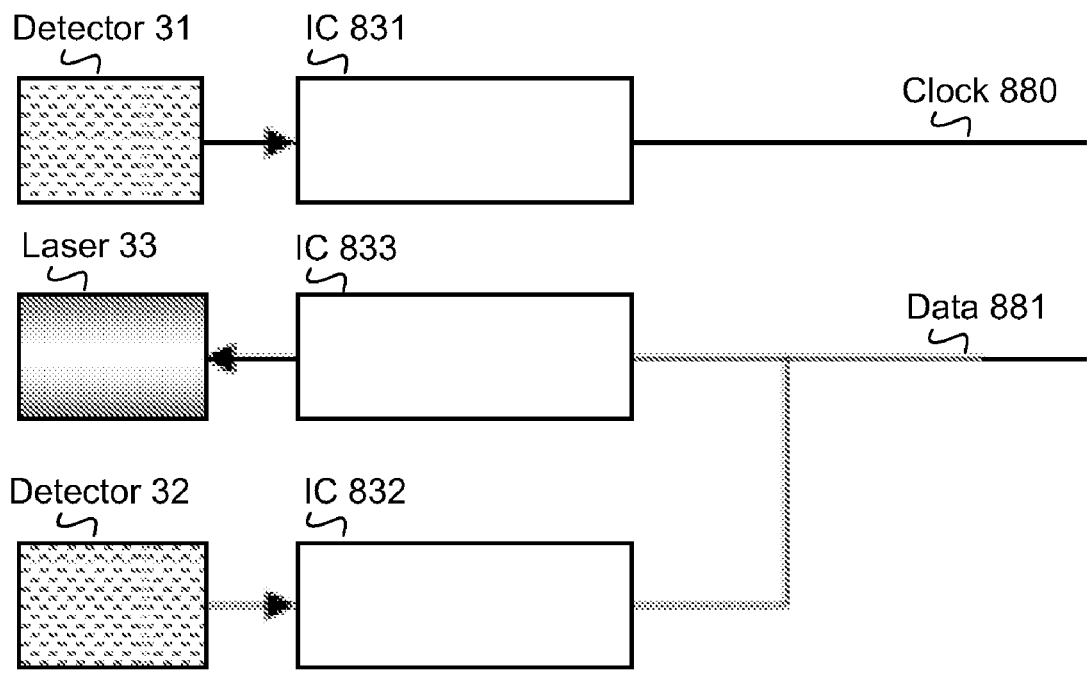
FIG. 8B illustrates an optical $I^2C$ bus configuration on the slave side.

FIG. 8A and FIG. 8B illustrate an example of optical I²C bus in accordance with one embodiment of the invention. An I²C bus is a dual wire bus that was developed for bidirectional inter-IC communications. FIG. 8A illustrates an optical I²C bus configuration on the master side, and FIG. 8B illustrates an optical I²C bus configuration on the slave side. As depicted in FIG. 8A, the components of the master side of the optical I²C bus connect to the laser 11, 12 and detector 13 components of FIG. 1A, for example. Likewise, as depicted in FIG. 8B, the components of the slave side of the optical I²C bus connect to the detector 31, 32 and laser 32 components of FIG. 3A, for example. Optical I²C bus converts electronic signals to optical signals to be communicated over great distances. Clock line 880 carries a clock signal driven by the master. Data line 881 allows the master to write data to a slave and read data back from the slave. IC 811, IC 812, and IC 813 are control/driver blocks for laser 11, detector 13, and laser 12, respectively. IC 831, IC 832 and IC 833 are control/driver blocks for detector 31, laser 33, and detector 32, respectively. Laser 11 shown in FIGS. 8A and 1A transmits clock signal 880 to detector 31 shown in FIGS. 8B and 3A. Laser 12 shown in FIGS. 8A and 1A writes a data signal from data line 881 to detector 32 shown in FIGS. 8B and 3A. Detector 13 shown in FIGS. 8A and 1A reads a data signal back from laser 33 shown in FIGS. 8B and 3A. As described above, all optical signals propagate through a single optical fiber.

The above description is included to illustrate the operation of the embodiments and is not meant to limit the scope of the invention. From the above discussion, many variations will be apparent to one skilled in the relevant art that would yet be encompassed by the spirit and scope of the invention. For example, the present invention has been described in particular detail with respect to several possible embodiments for high speed HDCP applications. Those of skill in the art will appreciate that the invention may be practiced in other embodiments, including with other combinations of numbers of forward and backward channels, and with other types of content carried by the optical signals. Also, the particular naming of the components is not mandatory or significant, and the mechanisms that implement the invention or its features may have different names. Also, the particular division of functionality between the various system components described herein is merely exemplary, and not mandatory; functions performed by a single system component may instead be performed by multiple components, and functions performed by multiple components may instead performed by a single component.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A transmission module having a waveguide combiner/splitter for single fiber bidirectional optical data communication, the module comprising:
    a first light source for transmitting light along a first forward channel through a first branch of a waveguide;
    a detector for receiving light along a backward channel through a second branch of the waveguide;
    a first optical fiber transverse to the forward and backward channels, the optical fiber being between the light source and the waveguide to couple the transmitted light to the first branch of the waveguide and being between the detector and the waveguide to couple the received light from the second branch of the waveguide; and
    a join-section of the waveguide, wherein the first and second branches of the waveguide merge.

2. The module of claim 1, wherein the first and second branches of the waveguide have lens-shaped interfaces to partially collimate light entering the waveguide and leaving the waveguide.

3. The module of claim 2, wherein the lens-shaped interfaces have convex surfaces oriented toward the first optical fiber.

4. The module of claim 1, wherein the detector is a PIN detector.

5. The module of claim 1, wherein the first light source is an infrared laser.

6. The module of claim 1, wherein a multimode optical fiber is optically coupled to the waveguide downstream from the join-section of the waveguide.

7. The module of claim 1, wherein the first branch of the waveguide tapers toward the join-section of the waveguide.

8. The module of claim 1, wherein the first branch has a smaller cross-section than the second branch at the join-section of the waveguide.

9. The module of claim 1, wherein the transmitted light along the first forward channel is an HDCP transmission.

10. The module of claim 1, further comprising a second light source for transmitting light along a second forward channel through a third branch of the waveguide, and wherein the first, second, and third branches of the waveguide merge in the join-section of the waveguide.

11. The module of claim 10, wherein the first branch has a smaller diameter than the third branch at the join-section of the waveguide and the third branch has a smaller cross-section than the second branch at the join-section of the waveguide.

12. The module of claim 11, wherein the first branch is approximately 10% smaller in cross-sectional area than the third branch at the join-section of the waveguide.

13. The module of claim 10, wherein the first light source and the second light source are near infrared light sources of different wavelengths.

14. The module of claim 10, wherein the first light source transmits clock signals, the second light source transmits data signals, and the detector receives data signals.

15. A receiver module having a waveguide combiner/splitter for single fiber bidirectional optical data communication, the module comprising:
 a first detector for receiving light along a first forward channel through a first branch of a waveguide;
 a light source for transmitting light along a backward channel through a second branch of the waveguide;
 a first optical fiber transverse to the forward and backward channels, the optical fiber being between the waveguide and the first detector to couple the received light from the first branch of the waveguide and being between the waveguide and the light source to couple the transmitted light to the first branch of the waveguide; and
 a join-section of the waveguide, wherein the first and second branches of the waveguide merge.

16. The module of claim 15, wherein the first and second branches of the waveguide have lens-shaped interfaces to partially collimate light entering and leaving the waveguide.

17. The module of claim 16, wherein the lens-shaped interfaces have convex surfaces oriented toward the first optical fiber.

18. The module of claim 15, wherein the first detector is a PIN detector.

19. The module of claim 15, wherein the light source is an infrared laser.

20. The module of claim 15, wherein a multimode optical fiber is optically coupled to the waveguide from the join-section of the waveguide.

21. The module of claim 15, wherein the second branch of the waveguide tapers toward the join-section of the waveguide.

22. The module of claim 15, wherein the second branch has a smaller cross-section than the first branch at the join-section of the waveguide.

23. The module of claim 15, wherein the received light along the first forward channel is an HDCP transmission.

24. The module of claim 15, further comprising a second detector for receiving light along a second forward channel through a third branch of the waveguide, and wherein the first, second, and third branches of the waveguide merge in the join-section of the waveguide.

25. The module of claim 24, wherein the second branch has a smaller cross-section than the third branch at the join-section of the waveguide and the third branch has a smaller cross-section than the first branch at the join-section of the waveguide.

26. The module of claim 25, wherein the third branch is approximately 10% smaller in cross-sectional area than the first branch at the join-section of the waveguide.

27. The module of claim 24, wherein the first detector receives clock signals, the second detector receives data signals, and the light source transmits data signals.

* * * * *